United States Patent Office 2,844,358
Patented July 22, 1958

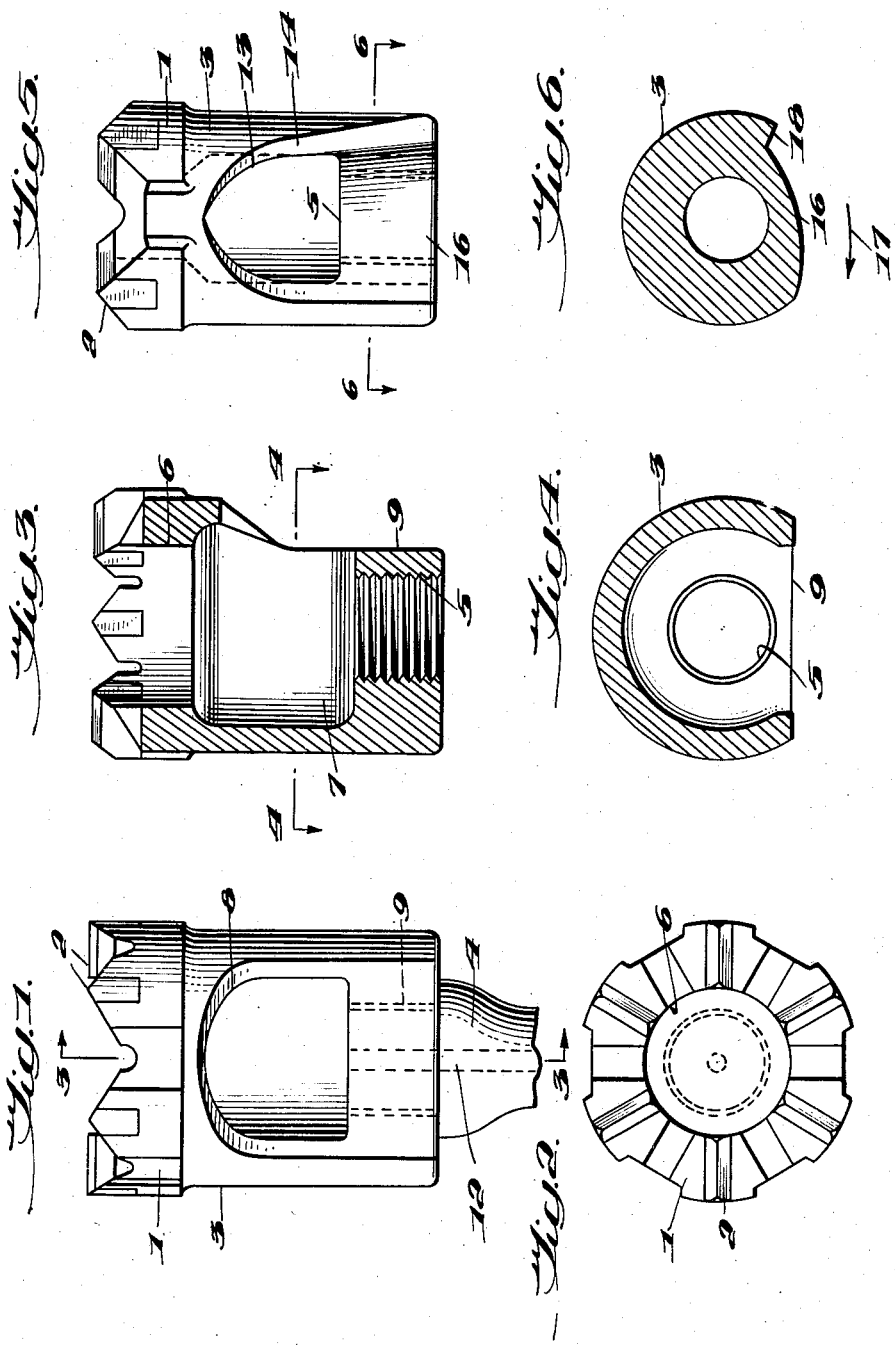

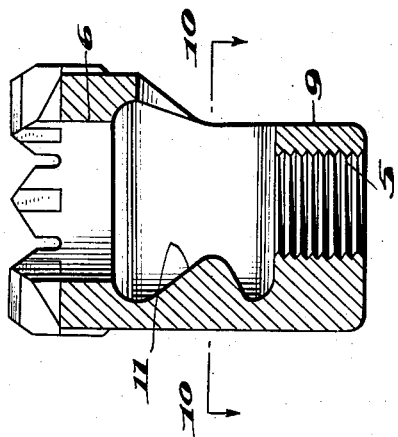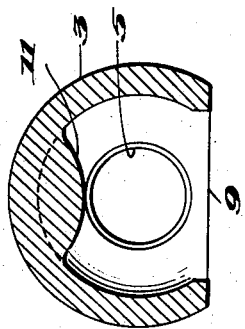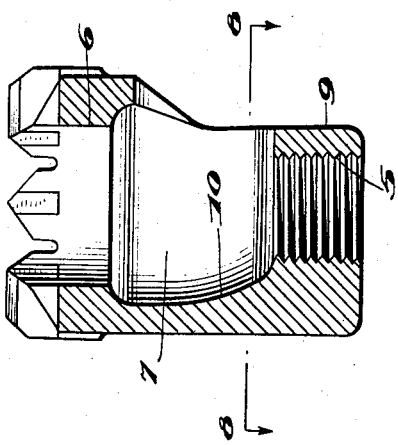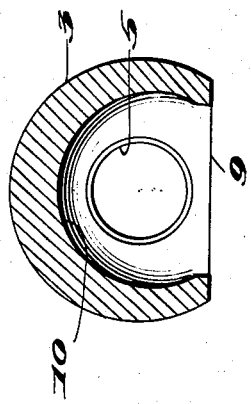

2,844,358

PERCUSSION DRILL BIT

Carl Borje Eberman and Bengt Erik Ragnwald Lofqvist, Sandviken, Sweden, assignors to Sandvikens Jernverks Aktiebolag, Sandviken, Sweden, a corporation of Sweden Application June 11, 1956, Serial No. 590,619

Claims priority, application Sweden August 12, 1955

7 Claims. (Cl. 255—63)

This invention relates to a percussion drill bit of the core-drill type.

Percussion drill bits generally are of the type in which the drill bit face works upon the entire drill hole cross-section and crushes all of the drilled material to a fine powder. This is true also of drill bits for drilling large holes having a diameter of the order of 100 mm. or more. Crushing all of the drill material to a powder consumes a considerable part of the energy applied to the bit and this retards the drilling rate or drill feed.

An increased drill rate in percussion drilling should be obtainable by using a core drill bit similar to those used in rotation drilling because a core drill bit is not required to crush all of the material taken out of the drill hole but only that constituting the annular drill section surrounding the core. It has however been found to be difficult in percussion core drilling to dispose of the core material even when the core is more or less crushed or broken. Especially when drilling hard rock the pieces formed by breaking the core interfere with the action of the drill bit and retard the drilling rate.

An object of the present invention is to provide a core drill bit for percussive drilling which is capable of disposing of the coarsely crushed or broken core material and thus is capable of drilling at a high rate of drill feed. In general the invention resides in a drill bit the cutting face of which is annular and is provided with hard cutting inserts and with one or more lateral openings for the discharge of core material communicating with the space within said annular face, the width of said opening or openings being at least equal to the diameter of said space.

In the preferred form of drill bit in accordance with the invention the diameter of the space within and adjacent to the annular drill face is less than the diameter of the space farther removed from said drill face and adjacent to said opening or openings. In its preferred form also the drill bit is provided with a recess, bevel or the like on the side thereof adjacent to said opening to facilitate the discharge of the crushed or broken core material from the interior of the drill bit. Further, in the preferred form of drill bit, it is provided with means within the core space within the bit for crushing or breaking the core, said means consisting for instance of a projection positioned to engage the core or a bottom wall which is inclined toward the outlet opening and/or with one or more hard metal cutting inserts similar to those in the cutting face of the bit, said cutting inserts being positioned in the bottom and/or side walls of said space to engage the core. It is also possible to cause the core to be broken as it moves through the bit by having the space within the bit unsymmetrical so that the core will be deflected sidewise and broken. A further feature of the preferred embodiment of the drill bit of our invention is that the face of the bit opposite the cutting face is plane and parallel to the cutting face and of substantially the same shape and size as the cutting face excepting for the portion thereof which is removed in forming the recess or bevel referred to above. This construction prevents the broken or crushed pieces of core material from wedging between the side surface of the drill bit and the surface of the drill hole and interfering with the free movement of the drill bit out of the drilled hole.

Drill bits in accordance with the invention are illustrated in the accompanying drawings in which Fig. 1 is a front or side elevation of one embodiment, Fig. 2 is a plan view of the cutting face of the embodiment shown in Fig. 1, Fig. 3 is a section on the line 3—3 of Fig. 1, Fig. 4 is a section on the line 4—4 of Fig. 3, Fig. 5 is an elevational view of a second embodiment, Fig. 6 is a section on the line 6—6 of Fig. 5, Fig. 7 is a section similar to Fig. 3 of another embodiment having an inclined bottom wall of the core space, Fig. 8 is a cross section on the line 8—8 of Fig. 7, Fig. 9 is a section similar to Fig. 3 of another embodiment having a projection from the side wall of the core space, and Fig. 10 is a section on the line 10—10 of Fig. 9.

Referring to Figs. 1 to 4, the drill bit comprises the annular head portion 1 which contains the hard metal cutting inserts 2, and the longer and somewhat smaller shank portion 3. The hard metal inserts may be formed of metal carbides such as tungsten carbide or the like sintered together with a binding metal such as cobalt or other metal of the iron group as is well known and may be secured in known manner e. g. by being secured in slots in the drill face by brazing. As stated above the outer diameter of the shank portion 3 of the drill bit is somewhat smaller than that of the head portion 1, preferably from about 2 to about 8 mm. less and is designed to be connected to the drill rod 4 for instance, by being provided with the threaded opening 5. The diameter of the circular opening 6 within the annular head 1 is less than the diameter of the cylindrical space 7 within the shank portion 3 of the drill bit. The shank portion of the drill bit is provided with one or more openings 8 extending through the wall thereof. The width of each opening 8 is equal to or greater than the diameter of the opening 6 within the head 1 and preferably as great as the diameter of the cylindrical space 7 within the shank portion 3. The opening or openings 8 may be of uniform width from top to bottom as viewed in Fig. 1 but preferably are somewhat wider at the bottom than at the top to facilitate the discharge of core material. Also, in order to facilitate the discharge of core material which may be in the form of granules or flakes the wall of the shank portion 3 of the drill bit is cut away below the opening 8 to provide a groove or recess or depressed or flattened area 9 so that the core material can escape from the interior of the drill bit through the opening 8 and through the space between the depressed surface 9 and the wall of the drill hole. This depressed area or surface 9 preferably has its greatest depth adjacent the lower edge or boundary of the opening 8 from $\frac{1}{3}$ to $\frac{1}{2}$ of the radial dimension or width of the annular cut made by the cutting head 1.

As stated above the opening or openings 8 preferably are wider at the bottom than at the top and this is effected as illustrated in Fig. 1 by making the top of the opening arch-shaped.

In order to obtain an effective discharge of the core material from the drill bit, it must be crushed or broken to a suitable size. Depending upon the character of the core material this may be promoted by simply sloping the bottom wall of the opening or recess 7 within the shank portion 3 as shown at 10 in Figs. 7 and 8 so that the core will be deflected sidewise and broken as it engages this inclined surface. As a substitute for or in addition to the inclined surface 10 the inner wall of the shank portion 3 may be provided with one or more projections 11 as shown in Figs. 9 and 10 which will engage and break or crush the core as it passes through the opening or space 7. The sloping bottom surface 10 and/or the projection 11 may be arranged in any suitable relationship to the opening 8 but preferably, as illustrated, are positioned opposite to or facing said opening. It may be desirable and is within the scope of our invention to arrange one or more hard metal carbide cutting inserts so that they project inwardly from the inner surface of the wall of the shank portion 3 into the space 7 where they will engage the core as it passes through said space. Whether or not devices such as are described above for crushing or breaking the core need be used depends upon the hardness and crushability of the core material. Generally such devices are unnecessary and the bottom of the space 7 within the shank portion of the drill bit may be a flat surface parallel to the face of the bit as shown in Fig. 3.

The drill rod 4 is provided with the flushing channel 12 for delivering flushing liquid to the cutting face of the bit.

In the embodiment illustrated in Figs. 5 and 6, the parts 1, 2, 3, 4, 5, 6, 7, 10, 11 and 12 may be identical with the corresponding parts in the embodiment illustrated in Figs. 1–4. In this embodiment of Figs. 5 and 6 the opening 13 has a lancet shaped upper end and the right hand side 14 of said opening diverges outwardly and downwardly to the bottom 15 of the opening. Also in this modification the surface of the recess 16 curves inwardly toward the axis of the drill bit in the direction opposite to the direction of rotation of the bit as indicated by the arrow 17 until it meets the outwardly inclined surface 18. It is noted that the line of intersection of the surface 18 with a plane perpendicular to the axis of the drill bit is substantially on a radius from said axis and that said surface is inclined downwardly and away from the rotating direction. The above described shape of the recess below the opening 13 facilitates the discharge of core material and tends to prevent the wedging of pieces of core material between the bit and the wall of the bore.

The unsymmetrical shapes of the drill bits due to the presence of said openings 8 and 13 and recesses 9 and 16 have not been found in practice, as might have been expected, to result in technical difficulties. The bore holes produced are round and straight and the drilling rate or drill feed has been found to be very satisfactory.

Drill bits in accordance with the invention have been found to be satisfactory for drilling both holes of normal size and holes of large size such as from 75 or 100 mm. diameter. They have been found to be suitable also for enlarging smaller drill holes of normal size.

We claim:

1. A percussion drill bit of the core drill type comprising a head portion and a shank portion, said head portion having an annular cutting face surrounding a circular opening, said shank portion being externally cylindrical and of smaller external diameter than the external diameter of said cutting face, said shank portion having means at the end farthest removed from said cutting face for attachment to a drill rod of smaller external diameter than the external diameter of said shank portion, said shank portion having a cylindrical cavity therein which communicates with and is of larger diameter than said circular opening, the side wall of said shank portion having a discharge opening therein the minimum dimension of which is at least equal to the inner diameter of said circular opening, the outer surface of said shank portion having a depressed area extending from said discharge opening to the end of said shank portion remote from said head portion, said depressed area being of greater width than said discharge opening, and means within said cylindrical cavity for breaking a core cut by said bit as it moves upwardly therein.

2. A drill bit as defined in claim 1 in which said means for breaking a core consists in that the surface of the wall of said cavity opposite said discharge opening is inclined toward said discharge opening.

3. A drill bit as defined in claim 1 in which said means for breaking a core consists of a projection extending from the surface of said cavity opposite said discharge opening toward said discharge opening.

4. A drill bit as defined in claim 1 in which said means for breaking a core consists of a cutting insert projecting into said cavity from a wall thereof.

5. A drill bit as defined in claim 1 in which said depressed area is a plane surface.

6. A drill bit as defined in claim 1 in which said discharge opening is lancet shaped with its pointed end adjacent said head portion.

7. A drill bit as defined in claim 1 in which said depressed area curves inwardly toward the axis of the bit in the direction opposite to the direction of rotation of the bit.

References Cited in the file of this patent

UNITED STATES PATENTS

| | | |
|---|---|---|
| 1,867,024 | Oliver | July 12, 1932 |
| 1,882,906 | Renfer | Oct. 18, 1932 |
| 2,506,474 | Tilden | May 2, 1950 |

FOREIGN PATENTS

| | | |
|---|---|---|
| 905,126 | Germany | Feb. 25, 1954 |